United States Patent
Kawanishi

(10) Patent No.: US 7,646,961 B2
(45) Date of Patent: Jan. 12, 2010

(54) DATA RECORDING AND REPRODUCTION APPARATUS

(75) Inventor: Yasuyuki Kawanishi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1220 days.

(21) Appl. No.: 10/940,493

(22) Filed: Sep. 14, 2004

(65) Prior Publication Data

US 2005/0058429 A1    Mar. 17, 2005

(30) Foreign Application Priority Data

Sep. 17, 2003    (JP)    ............................. 2003-324871

(51) Int. Cl.
*H04N 5/91* (2006.01)
*H04N 7/26* (2006.01)

(52) U.S. Cl. ............................. 386/83; 386/46; 386/124

(58) Field of Classification Search .................. 386/46, 386/83, 95, 124–126, 52, 55; 710/52; 725/39; 345/156, 157, 620, 650

See application file for complete search history.

(56) References Cited

U.S. PATENT DOCUMENTS

| | | | | |
|---|---|---|---|---|
| 4,847,696 | A | * | 7/1989 | Matsumoto et al. ............ 386/83 |
| 5,664,087 | A | * | 9/1997 | Tani et al. .................... 345/473 |
| 6,363,440 | B1 | * | 3/2002 | Stepp et al. .................... 710/52 |
| 7,120,922 | B2 | * | 10/2006 | Rodriguez et al. ............. 725/39 |
| 2002/0054750 | A1 | * | 5/2002 | Ficco et al. .................... 386/46 |
| 2004/0013409 | A1 | * | 1/2004 | Beach et al. .................... 386/83 |

FOREIGN PATENT DOCUMENTS

| | | |
|---|---|---|
| JP | 6-60475 | 3/1994 |
| JP | 06-236593 | 8/1994 |
| JP | 11-248870 | 9/1999 |
| JP | 2000-350130 | 12/2000 |
| JP | 2002-44542 | 2/2002 |

(Continued)

OTHER PUBLICATIONS

Japanese Office Action for Japanese patent application No. 2003-324871, mailed Dec. 19, 2006, and English translation thereof, 4 pages.

(Continued)

*Primary Examiner*—Thai Tran
*Assistant Examiner*—Mishawn Dunn
(74) *Attorney, Agent, or Firm*—Osha • Liang LLP

(57) ABSTRACT

A recording time setting process, performed by a data recording and reproduction apparatus capable of readily setting a recording start time and a recording finish time, includes: the step of detecting execution of a meter recording setting mode, the step of detecting an input of recording start position, the step of calculating a time from the recording start position, the step of storing the recording start time in a memory, the step of detecting an input of recording finish position, the step of calculating a time from the recording finish position, the step of calculating a recording time period when the recording finish position is determined, and the step of storing the recording finish time in the memory if the recording time period has not yet been selected for another recording and if the required capacity does not exceed the storage capacity of the HDD.

8 Claims, 9 Drawing Sheets

FOREIGN PATENT DOCUMENTS

| | | |
|---|---|---|
| JP | 2002-100162 | 4/2002 |
| JP | 2002-142177 | 5/2002 |
| JP | 2002-152635 | 5/2002 |
| JP | 2003-224811 | 8/2003 |

OTHER PUBLICATIONS

Patent Abstracts of Japan, Publication No. 2003-224811, Publication Date: Aug. 8, 2003, 1 page.

Patent Abstracts of Japan, Publication No. 2002-142177, Publication Date: May 17, 2002, 1 page.

Patent Abstracts of Japan, Publication No. 2002-100162, Publication Date: Apr. 5, 2002, 1 page.

Patent Abstracts of Japan, Publication No. 2002-152635, Publication Date: May 24, 2002, 1 page.

Japanese Office Action for Japanese Application No. 2003-324871, mailed on Mar. 26, 2007, and English translation thereof (4 pages).

Patent Abstracts of Japan for Japanese Publication No. 06-060475, Publication date Mar. 4, 1994 (1 page).

Patent Abstracts of Japan, Publication No. 2000-350130, publication dated Dec. 15, 2000 (1 page).

Patent Abstracts of Japan, Publication No. 2002-044542, publication dated Feb. 8, 2002 (1 page).

Patent Abstracts of Japan, Publication No. 06-236593, Publication Date: Aug. 23, 1994, 1 page.

Patent Abstracts of Japan, Publication No. 11-248870, Publication Date: Sep. 17, 1999, 1 page.

Office Action in Japanese Patent Application No. 2003-324871, mailed Jun. 26, 2007, and English translation thereof, 4 pages.

* cited by examiner

FIG.4

| RECORDING START TIME | RECORDING FINISH TIME | RECORDING CHANNEL | RECORDING MODE |
|---|---|---|---|
| 2003/11/22/21:00 | 2003/11/22/21:55 | 8 | STANDARD |

| PROGRAM NUMBER | RECORDING START TIME ~404 | RECORDING FINISH TIME ~406 | RECORDING CHANNEL ~408 | RECORDING MODE ~410 |
|---|---|---|---|---|
| 1 | 2003/11/22/23:00 | 2003/11/22/23:55 | 8 | HIGH-QUALITY |
| 2 | 2003/12/23/21:00 | 2003/12/23/21:00 | 6 | STANDARD |
| --- | --- | --- | --- | --- |
| n | | | | |

~402

DATA RECORDING AND REPRODUCTION APPARATUS

BACKGROUND OF THE INVENTION

1. Field of the Invention

The present invention relates to a technique for recording information, and more particularly to a data recording and reproduction apparatus permitting easy setting of a recording time period.

2. Description of the Background Art

To record a television program on a VTR (Video Tape Recorder), a HDD (Hard Disk Drive) recorder or another recording apparatus, a user inputs information necessary for the recording via a remote control terminal or manipulation buttons provided at the recording apparatus. The information includes a recording start time and finish time, a recording channel, a recording mode and others. With the method requiring input of the information necessary for the recording via the user's manipulations, the number of items to be input inevitably increases. This invites erroneous input of the items, ending in failure of recording of the program of interest.

To solve the above-described problems, Japanese Patent Laying-Open No. 2000-350130, for example, discloses a recording and reproduction apparatus that can simplify the control structure of time-shift reproduction. This recording and reproduction apparatus includes a memory permitting random accesses, a circuit performing compression of input video signals to output to the memory, a circuit performing decompression of the video signals recorded on the memory to output, a circuit controlling input/output of the video signals for recording video and the recording, a circuit controlling input/output of the video signals for reproducing the video and the reproduction, and a manipulation input portion.

With this apparatus, when the recording or the reproduction of the video signals is instructed, at least one of the recording and the reproduction is controlled and executed. When the time-shift reproduction is instructed, the recording and the reproduction are controlled to execute the time-shift reproduction.

According to the above-described recording and reproduction apparatus, however, a desired program would not be recorded if the user erroneously inputs the start time or finish time of the recording.

SUMMARY OF THE INVENTION

The present invention has been made to solve the above-described problems, and an object of the present invention is to provide a data recording and reproduction apparatus permitting easy setting of recording times and reducing manipulation mistakes by the user.

To solve the above-described problems, the data recording and reproduction apparatus according to an aspect of the present invention includes: a receiving portion receiving audio-visual data; a recording portion recording the received audio-visual data; a reproduction portion reproducing the recorded audio-visual data; a display control portion generating a signal to display a screen for setting a start time and a finish time of recording of the audio-visual data; and a detecting portion detecting an input by a user. The display control portion generates a signal to display a graphic form having a shape extending at least to a one-dimensional coordinate direction. The detecting portion detects the input by the user on the displayed graphic form to set the start time and the finish time of the recording.

According to the data recording and reproduction apparatus described above, the display control portion generates the signal to display the screen (of, e.g., a rectangular shape) for setting the start time and the finish time of recording of the received audio-visual data. When the display control portion generates the signal to display the graphic form having the shape extending at least to a one-dimensional coordinate direction, the graphic form corresponding to the signal is displayed on, e.g., a display device connected to the data recording and reproduction apparatus or a display portion provided in the data recording and reproduction apparatus. When the detecting portion detects an input by the user on the displayed graphic form for setting the start time and the finish time of the recording, the data recording and reproduction apparatus can start and finish the data recording based on the relevant times. With this configuration, the user does not need to directly input the recording start or finish time of the audio-visual data. Rather, the user can set the times referring to the displayed graphic form. Accordingly, a data recording and reproduction apparatus capable of reducing manipulation mistakes by the user upon setting of the start or finish time of data recording can be provided.

Preferably, the data recording and reproduction apparatus further includes: a management portion managing a storage area of the recording portion by dividing the storage area into a buffer area for recording the audio-visual data temporarily and a save area for recording the audio-visual data over a long term; and a recording and reproduction control portion controlling the recording portion and the reproduction portion to record the audio-visual data on the buffer area and at the same time sequentially reproduce the data received in the past and recorded on the buffer area. The detecting portion detects an input by the user on the displayed graphic form to cause the data temporarily recorded on the buffer area to be saved over a long term.

According to the data recording and reproduction apparatus described above, the recording and reproduction control portion controls the recording portion and the reproduction portion to record the audio-visual data on the buffer area, and at the same time, sequentially reproduce the data having been received and recorded on the buffer area. The detecting portion detects an input by the user on the displayed graphic form to cause the data temporarily recorded on the buffer area to be saved over a long term. The user can input the instruction to save the previously received data over a long term, on the graphic form displayed on the screen. This eliminates the need to directly input the start or finish time of recording of the audio-visual data received in the past.

Preferably, the management portion manages the recording portion, based on the detected user input, to cause the audio-visual data recorded on the buffer area to be recorded on the save area.

According to the data recording and reproduction apparatus described above, the audio-visual data that the user desires to save over a long term can be recorded on the save area, while the other data are sequentially recorded on the buffer area.

Preferably, the recording portion records attribute data representing an attribute of the audio-visual data being recorded, and the management portion, based on the detected user input, changes a content of the attribute data for the audio-visual data recorded on the buffer area to a content indicating that the data is to be saved over a long term.

According to the data recording and reproduction apparatus described above, the content of the attribute data representing the attribute of the audio-visual data being recorded is changed to allow the audio-visual data recorded on the buffer area to be saved over a long term without transferring the same to the save area.

Preferably, the graphic form having a shape extending at least to a one-dimensional coordinate direction is of a rectangular shape, and the one-dimensional coordinate direction of the rectangular shape corresponds to data storage capacity of the recording portion.

According to the data recording and reproduction apparatus described above, the rectangular shape corresponding to the data storage capacity is displayed. The user can set the recording start time and finish time on the display, which ensures easy input for recording the audio-visual data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a data structure for setting the time-shift recording.

FIG. 6 shows a data structure for use in programmed recording.

DESCRIPTION OF THE PREFERRED EMBODIMENTS

Figure 1:
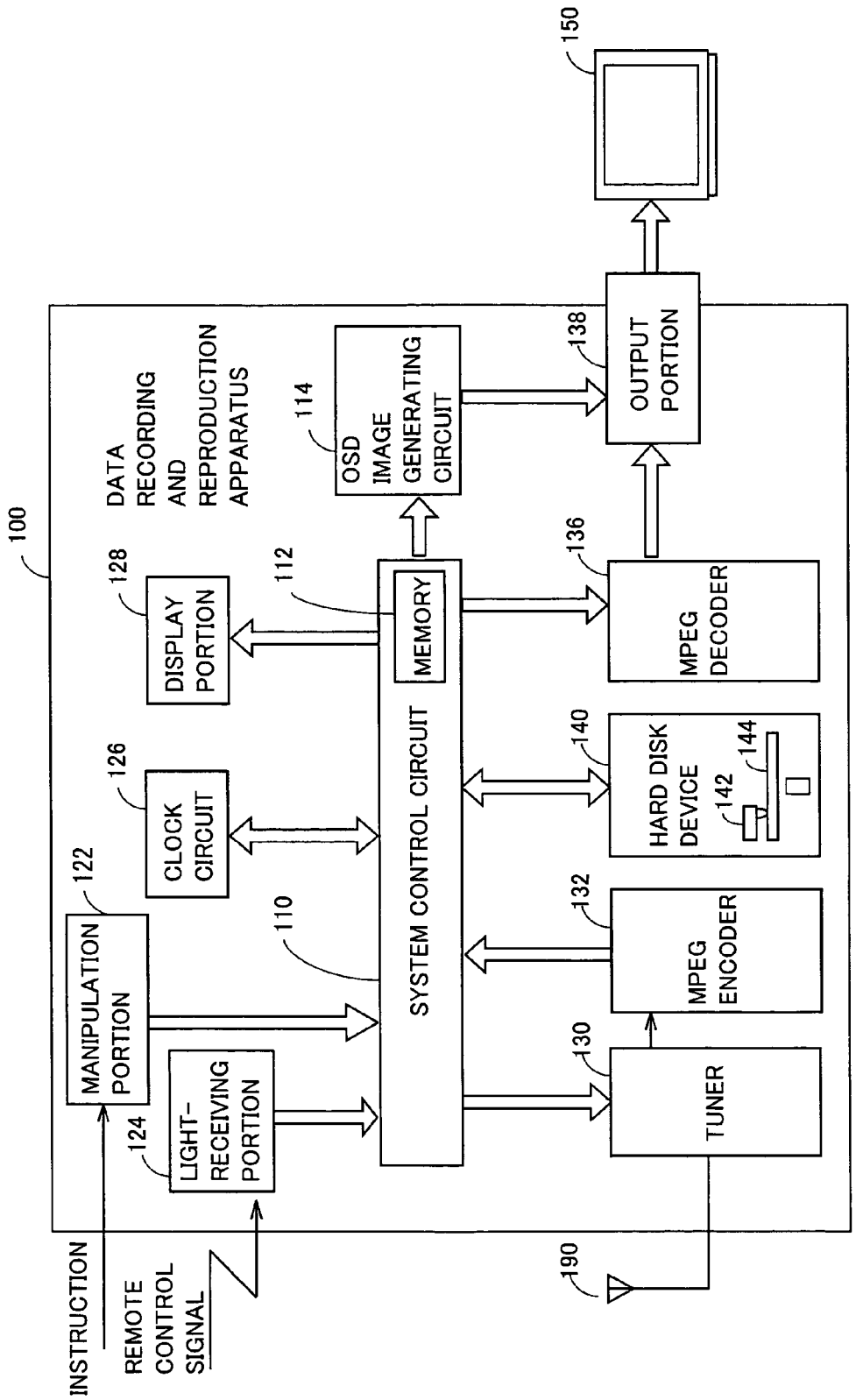
FIG. 1 is a block diagram showing a configuration of a data recording and reproduction apparatus 100 according to an embodiment of the present invention.

Hereinafter, embodiments of the present invention will be described with reference to the drawings. In the following description, the same reference characters denote the same or corresponding portions having the same names and functions. Thus, detailed description thereof will not be repeated where appropriate.

A data recording and reproduction apparatus 100 according to an embodiment of the present invention is described with reference to FIG. 1. The data recording and reproduction apparatus 100 includes a system control circuit 110, an OSD (On Screen Display) image generating circuit 114, a manipulation portion 122, a light-receiving portion 124, a clock circuit 126, a display portion 128, a tuner 130, an MPEG (Moving Picture Experts Group) encoder 132, a hard disk device 140, an MPEG decoder 136, and an output portion 138. System control circuit 110 includes a memory 112. Hard disk device 140 includes a hard disk 144 and an information recording head 142.

Data recording and reproduction apparatus 100 may be a HDD recorder, although it is not restricted thereto. In another aspect, data recording and reproduction apparatus 100 may be a PC (Personal Computer) provided with the HDD, for example. In this case, operations of the respective portions may be controlled based on commands from a CPU (Central Processing Unit), instead of signals from system control circuit 110.

Data recording and reproduction apparatus 100 is connected to a television set 150. Alternatively, a monitor dedicated to display or the like may be connected to data recording and reproduction apparatus 100 for use as a display device.

System control circuit 110 controls operations of data recording and reproduction apparatus 100 while inputting and outputting signals, as will be described later. The operations may include recording of received audio-visual data, reading of the recorded data, and others. The control is conducted based on a program pre-stored in memory 112, for example.

System control circuit 110, upon detection of a user instruction, generates a signal to display prescribed screens. The screens may include one for setting a recording start time or finish time, and others.

OSD image generating circuit 114 generates a signal to display a message image, based on a user instruction received via manipulation portion 122 or light-receiving portion 124, or based on a condition predetermined in system control circuit 110. The message images may include those for displaying channel, recording setting screen, volume, and others. The message images differ from images recorded on hard disk device 140. OSD image generating circuit 114 outputs the generated signal for the message image to output portion 138. When the signal is output, the message image corresponding to the signal is displayed on television set 150.

Manipulation portion 122 detects an instruction input by the user. Manipulation portion 122 may be input buttons provided on a front panel of data recording and reproduction apparatus 100, for example, although it is not restricted thereto. When the instruction is detected, a signal to execute a process corresponding to the instruction is generated. The signal is output to system control circuit 110.

Light-receiving portion 124 receives a signal output from a remote control terminal as will be described later. This signal is output to system control circuit 110.

Clock circuit 126 keeps the time in data recording and reproduction apparatus 100. Although clock circuit 126 operates based on externally supplied power, it can continue its operation for a preset period of time after a temporary power failure. Clock circuit 126 outputs time data to system control circuit 110. Clock circuit 126 receives a control signal from system control circuit 110. The time of clock circuit 126 is corrected based on this signal.

Display portion 128 displays information regarding data recording and reproduction apparatus 100. The information may include time period, a receive channel, counter, recording/reproduction modes and other items. Display portion 128 may be an indicator formed on the front surface of data recording and reproduction apparatus 100, for example, although it is not restricted thereto.

An antenna 190 is connected to tuner 130. Tuner 130 may be any tuner that can receive audio-visual data broadcast via analog broadcasting, digital broadcasting or the like. The radio waves received via tuner 130 are output to MPEG encoder 132. Tuner 130 can switch the receive channel based on a signal from system control circuit 110.

MPEG encoder 132 converts the signal input from tuner 130 to a digital signal, and outputs the same to system control circuit 110. Hard disk device 140 writes the MPEG-coded data to hard disk 144 by information recording head 142, or reads the data stored in hard disk 144, based on the signal from system control circuit 110.

MPEG decoder 136 decodes the MPEG-coded data read from hard disk device 140, and outputs the same to output portion 138. Output portion 138 outputs the signal from OSD image generating circuit 114 and the signal from MPEG decoder 136 to television set 150. As such, television set 150 displays the image message generated by OSD image generating circuit 114 and the video read from hard disk device 140.

Figure 2:
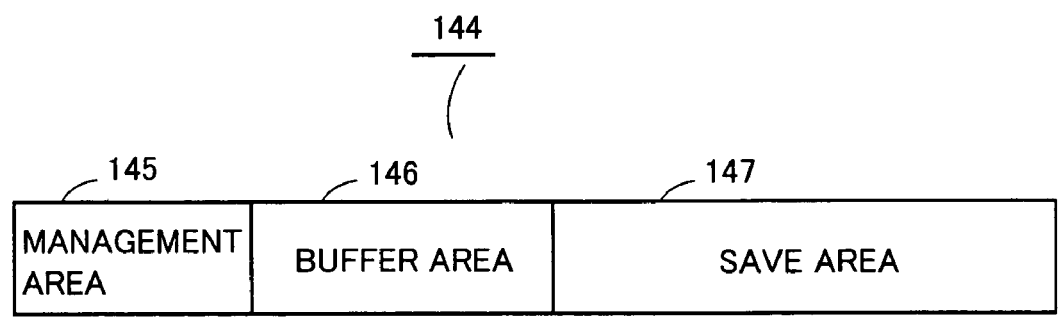
FIG. 2 schematically shows a data storage area in a hard disk 144 included in the hard disk device 140 shown in FIG. 1.

Data recording in data recording and reproduction apparatus 100 according to the present embodiment is now described with reference to FIG. 2. Hard disk 144 includes, as its storage area, a management area 145, a buffer area 146 and a save area 147.

Management data for managing data recorded on hard disk 144 is recorded on management area 145. The management data includes attribute data representing an attribute of data that indicates, for example, whether the data recorded on buffer area 146 or save area 147 is one to be recorded temporarily or one to be recorded lastingly or over a long term.

Audio-visual data received by data recording and reproduction apparatus 100 is temporarily recorded on buffer area 146. When buffer area 146 becomes full, newly received audio-visual data are recorded from the starting address of buffer area 146 to overwrite the already recorded audio-visual data.

Time-shift reproduction executed by data recording and reproduction apparatus 100 of the present embodiment is now explained. The time-shift reproduction refers to a process where, instead of displaying audio-visual data received via antenna 190 as it is on television set 150 or another display device, the data is once recorded on hard disk device 140, the recorded data is read and decoded, and the decoded signal is displayed on a display device. In this process, information recording head 142 of hard disk device 140 sequentially records the signals converted to the MPEG format on the buffer area of hard disk 144, in response to the recording command signal supplied from system control circuit 110. The signals are read by information recording head 142, and decoded by MPEG decoder 136, and then output via output portion 138. As such, the audio-visual data received via antenna 190 is displayed behind its received timing, with a delay corresponding to the time period required for the data recording and reproducing processes. When the time-shift process is ongoing, the received audio-visual data are stored within a range of capacity of buffer area 146, until it is overwritten by other data.

The data recorded on buffer area 146 may be configured to have an attribute of "overwrite-protect", based on the attribute data recorded on management area 145. By doing so, the data recorded on buffer area 146 may be saved lastingly unless otherwise instructed by the user.

The data to be saved for a long term is stored in save area 147. For such data transfer, the data corresponding to the time period designated by the user are read from buffer area 146 and written into save area 147. For example, assume that a user is watching a program on television set 150, and desires to ultimately save the broadcast program, such as the portion having watched. When the user inputs a start time and a finish time of recording, the data recorded on buffer area 146 is transferred to and saved in save area 147. This ensures that the user can save the data as desired, while the received audio-visual data are sequentially recorded on buffer area 146.

A remote control terminal 200 for sending a signal to data recording and reproduction apparatus 100 according to the present embodiment is now described with reference to FIG. 3. Remote control terminal 200 includes a monitor 210, a cursor button 220, and a ten key keypad 230. Monitor 210 displays an instruction input by a user. Cursor button 220 is for changing a position of the cursor prompting an input that is displayed on television set 150 or another display device. Ten key keypad 230 is for inputting a prescribed instruction or for selecting a channel the user desires to select.

Figure 3:
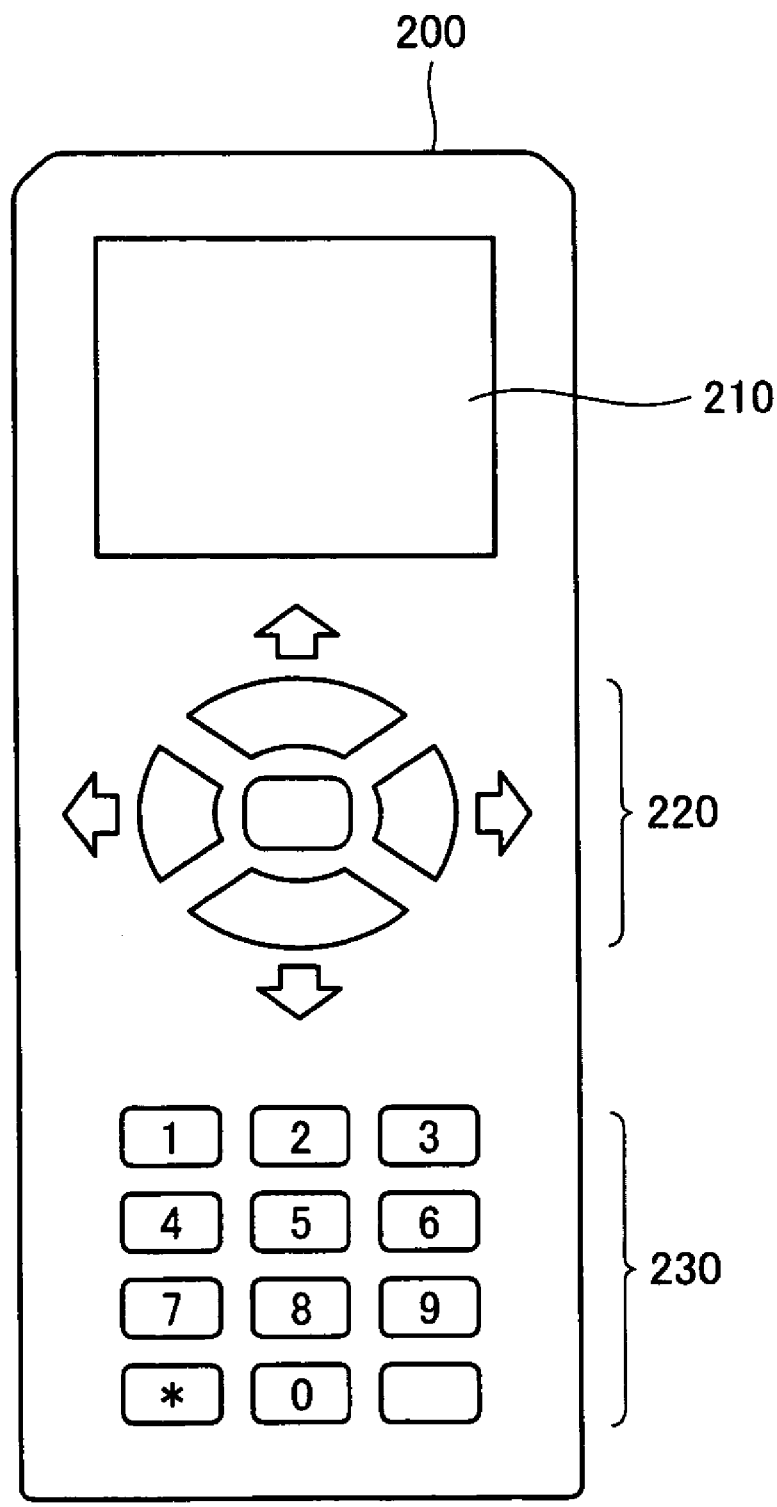
FIG. 3 schematically shows a remote control terminal 200.

Remote control terminal 200 is not restricted to the one shown in FIG. 3. Remote control terminal 200 may be any terminal capable of sending remote control signals for instructing switching of display, programming of recording, and others.

When the user depresses a specific button, with remote control terminal 200 directed to data recording and reproduction apparatus 100, a remote control signal is sent from a sending portion (not shown) in response to the depression. When the signal is received at light-receiving portion 124 of data recording and reproduction apparatus 100, data recording and reproduction apparatus 100 executes a process corresponding to the signal. For example, when the user depresses a recording setting button (not shown), the display screen is switched to a recording setting screen. Setting of the recording start time or the recording finish time can be changed as the user depresses cursor button 220 to move the cursor to the left or to the right.

Data used when data recording and reproduction apparatus 100 of the present embodiment performs time-shift recording is now described with reference to FIG. 4. The data may be stored in memory 112 provided in system control circuit 110, or in management area 145 of hard disk 144, although the data storage location is not restricted thereto. Note that the time-shift recording refers to a process to cause the already received and temporarily recorded data to be saved over a long term. This enables the user to save the already received data that he/she was not originally intended to save.

As shown in FIG. 4, the recording start time is stored in a field 302, and the recording finish time is stored in a field 304. The recording start time or the recording finish time is not limited to the time yet to come. It may be a time of the past, for example. The recording start or finish time is calculated, e.g., when the user depresses cursor button 220 of remote control terminal 200, according to the depressed amount of the button or the period of time of depression. Alternatively, the time may be calculated based on the user's manipulation performed similarly on manipulation portion 122 of data recording and reproduction apparatus 100.

The recording channel is stored in a field 306. The recording channel refers to a receive channel of audio-visual data that is input via remote control terminal 200 or manipulation portion 122. The recording mode is stored in a field 308. The recording mode refers to a mode to designate image quality, for example. The recording modes may include a standard mode, a high-quality mode, and others.

In the example of FIG. 4, the time-shift recording starts at 21:00 on Nov. 22, 2003, and finishes at 21:55. The designated channel is channel 8, and the recording mode is the "standard mode".

In FIG. 4, assuming that the current time is 21:10 on Nov. 22, 2003, the user manipulates cursor button 220 of remote control terminal 200 to set the start position so that the time display (e.g., the bar graph and the numerical display) on the recording setting screen shows 21:00. When the user depresses the decision button (not shown), the data of 21:00, Nov. 22, 2003 is stored in field 302.

Similarly, when the user manipulates cursor button 220 to obtain the time display of 21:55 on the recording setting screen and depresses the decision button, the data of 21:55, Nov. 22, 2003 is stored in field 304. As such, the time-shift recording is executed based on the data corresponding to at least one record that is stored in accordance with a prescribed manipulation by the user.

It is noted that the time display on the recording setting screen is not restricted to the bar graph and the numerical display as described above. The display may be of any image with which the user can recognize the image of the storage area in hard disk 144 and to which the user can input the start time and the finish time of recording.

Screens displayed on television set 150 connected to data recording and reproduction apparatus 100 according to the present embodiment are now explained with reference to FIGS. 5A-5C. These screens are displayed based on signals generated by system control circuit 110.

Figure 5A:
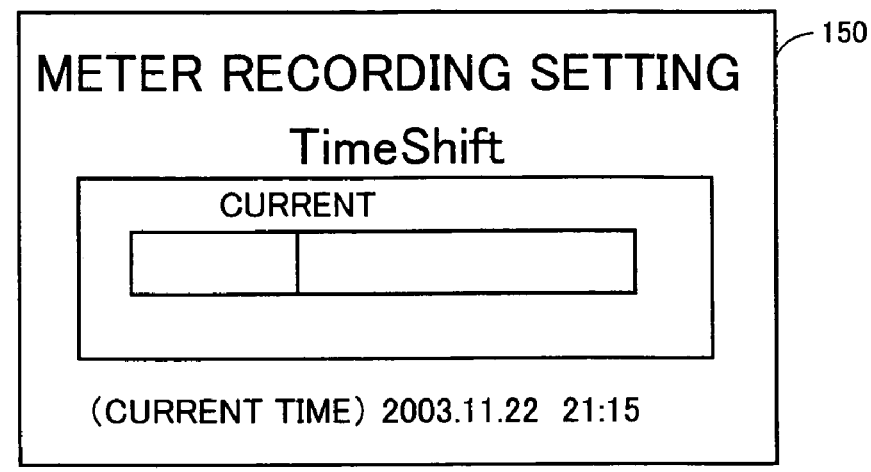
FIGS. 5A-5C show recording setting screens displayed on a television set 150.

FIG. 5A shows a recording setting screen ("meter recording setting" screen) that is initially displayed by a user instruction. In this screen, a graphic form (e.g., a rectangle, a bar graph or the like) corresponding to the recording area of hard disk 144 is shown, and the current position is indicated on the graphic form. The current position corresponds to the position of information recording head 142 at the current time.

Figure 5B:
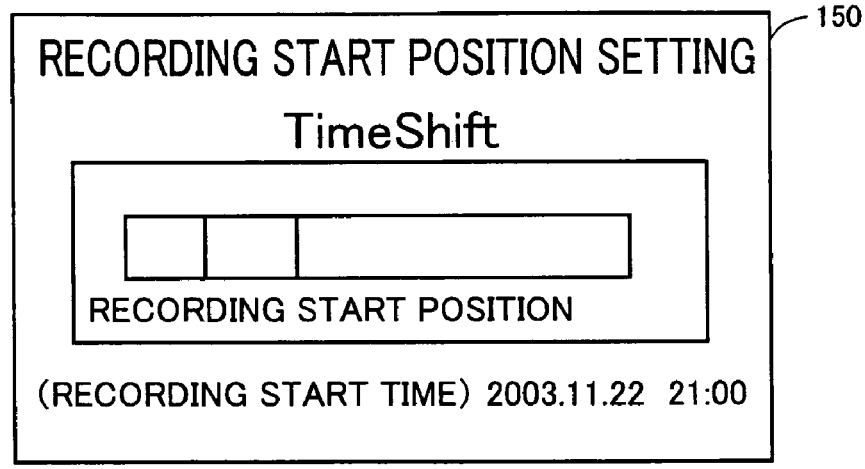

FIG. 5B shows a recording start position setting screen that is displayed by a user instruction. For example, when the user depresses a button (not shown) to input the recording start position with respect to the screen of FIG. 5A, the screen is switched to the recording start position setting screen. When the user depresses cursor button 210 of remote control terminal 200 to the left or to the right with respect to the screen, the recording start position corresponding to the depression is displayed. The recording start time corresponding to the position is also displayed.

Figure 5C:
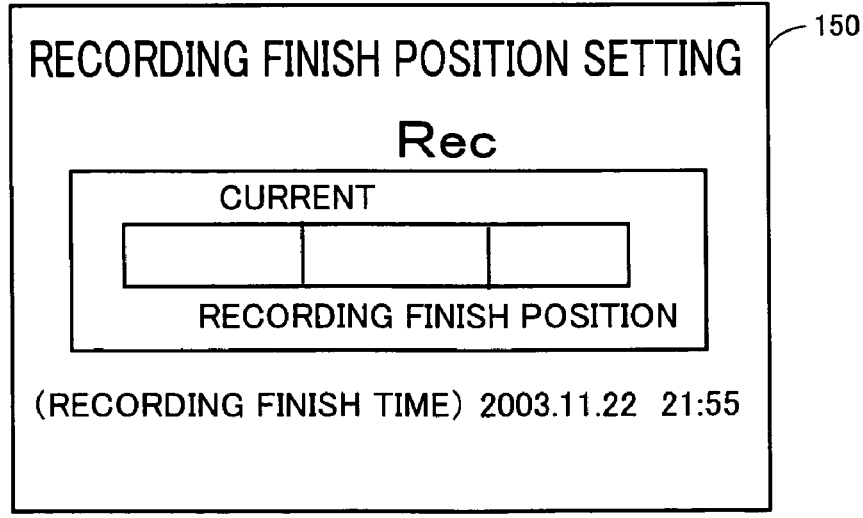

FIG. 5C shows a recording finish position setting screen that is displayed by a user instruction. When the user depresses a button to confirm the input with respect to the screen of FIG. 5B, the screen of television set 150 is switched to the recording finish position setting screen. When the user depresses cursor button 210 of remote control terminal 200 to the light or to the right with respect to the screen, the recording finish position corresponding to the depression is displayed, along with the recording finish time corresponding to the position.

With this configuration, the user does not need to directly input the recording start or finish time to set the same. Accordingly, erroneous setting of the recording start or finish time can be prevented.

It is noted that the time period from the recording start time to the recording finish time, for example, may be displayed in addition to the items shown in FIGS. 5A-5C. System control circuit 110 calculates the time period, e.g., when the user completes the setting of the recording finish time. With this display, the user can readily confirm the duration of recording.

Data used when data recording and reproduction apparatus 100 of the present embodiment performs programmed recording is now described with reference to FIG. 6. The data may be stored in memory 112 of system control circuit 110 or in hard disk device 140, as in the case of the data shown in FIG. 4.

A program number is stored in a field 402. The program number is for identification of programmed information. For example, when a plurality of recoding schedules are set, the program numbers are automatically assigned thereto in order of programming, and stored in field 402. The recording start time is stored in a field 404, and the recording finish time is stored in a field 406. The recording start or finish time is set by a user manipulation of remote control terminal 200 or manipulation portion 122. The recording channel is stored in a field 408. The recording mode is stored in a field 410.

In the example of FIG. 6, the programmed recording indicated by the program number "1" starts at 23:00, Nov. 22, 2003, and finishes at 23:55 on the same day. The channel to be recorded is "8". The recording mode is the high-quality mode.

It is noted that the data items stored in hard disk device 140 are not limited to those shown in FIG. 6, but other items may be included. For example, a field for recording attribute information (e.g., "overwrite-protect" or the like) of the program input by the user via remote control terminal 200 may be provided. Further, the data for the time-shift recording shown in FIG. 4 and the data for the programmed recording shown in FIG. 6 may be stored in one and the same table.

Figure 7:
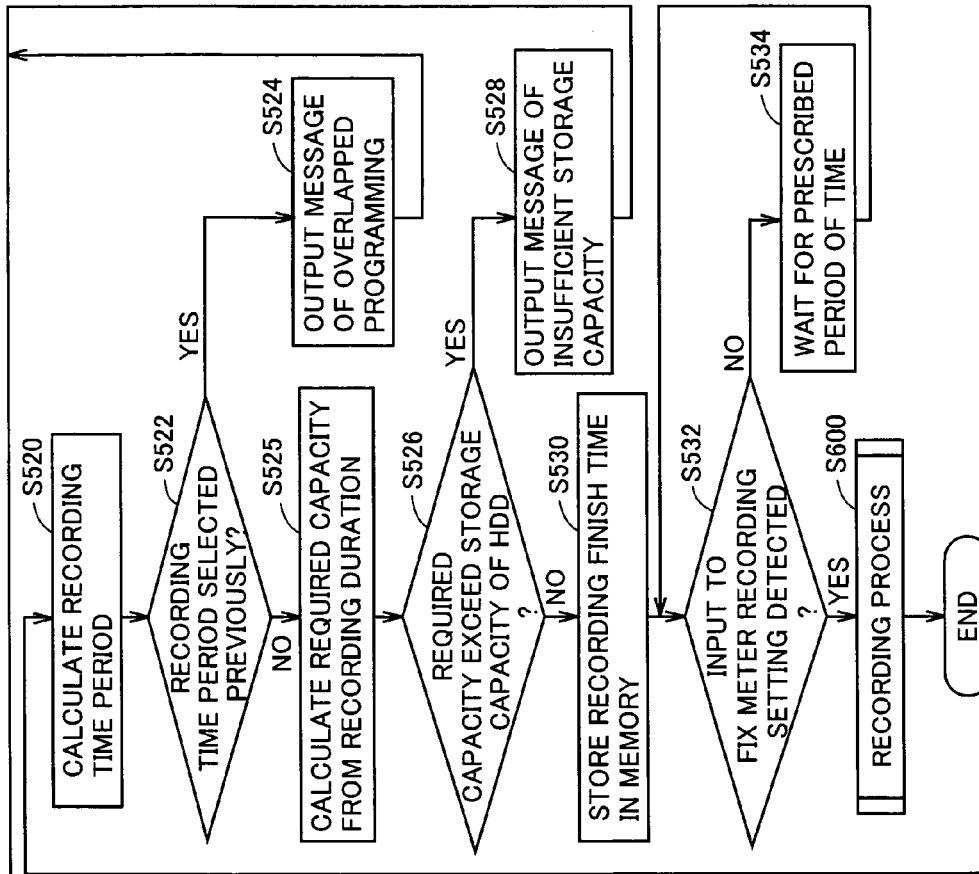
FIG. 7 is a flowchart illustrating procedure of the process performed by the system control circuit 110.
Figure 7:
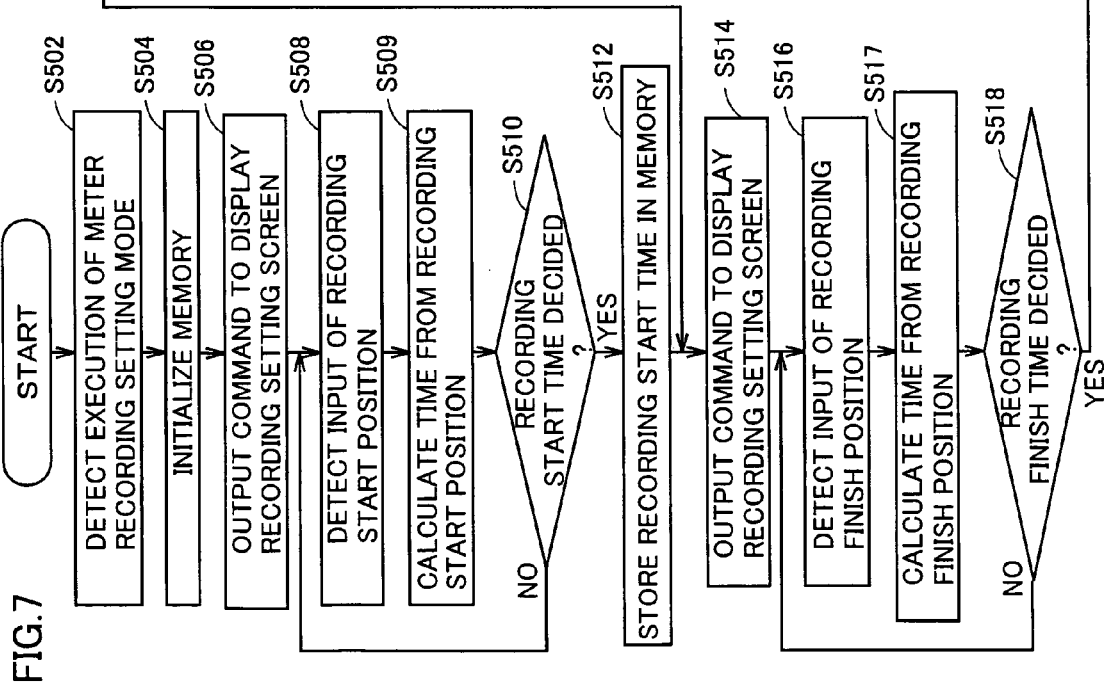

A control structure of system control circuit 110 implementing the data recording and reproduction apparatus 100 according to the present embodiment is now described with reference to FIG. 7.

In step S502, system control circuit 110 detects execution of a meter recording setting mode. This detection is made, e.g., when the user manipulates remote control terminal 200 to select the meter recording setting mode. Here, the meter recording setting mode refers to the mode where a meter for setting the recording time is displayed on television set 150 and the user can set the recording time (setting of time-shift recording, programmed recording and others) on the display screen.

In step S504, system control circuit 110 initializes memory 112. In step S506, system control circuit 110 outputs a command to display the recording setting screen. The command includes a signal to display a prescribed screen. When the command is output, the meter recording setting screen is displayed on television set 150.

In step S508, system control circuit 110 detects an input of recording start position. This detection is made in response to a prescribed button manipulation by the user on remote control terminal 200. The recording start position in the meter displayed on television set 150 changes in accordance with the user's button manipulation. For example, when cursor button 220 is depressed to move the cursor to the left, the recording start position also moves to the left. This button manipulation by the user makes the recording start time go back further to the past.

In step S509, system control circuit 110 calculates a recording start time corresponding to the recording start position. This calculation is performed based, e.g., on the current time, the current position on the meter, the detected recording start position, and the capacity of the buffer area of hard disk device 140. The buffer area refers to the area in which data is temporarily stored. The capacity of the buffer area is converted to a time period (hereinafter, referred to as the "temporarily storable time period"). The temporarily storable time period is converted to the length (hereinafter, referred to as the "buffer area length") to be displayed on the meter. A difference between the position indicating the current time on the meter display and the recording start position set by the user is calculated. A ratio of the difference with respect to the buffer area length is calculated. The recording time period up to the current time is calculated based on the ratio and the temporarily storable time period. The recording start time is calculated by subtracting the relevant recording time period from the current time.

In step S510, system control circuit 110 determines whether the recording start time has been fixed This determination is made based on whether data recording and reproduction apparatus 100 has received a prescribed remote control signal from remote control terminal 200. This signal is issued when the user depresses the decision button (not shown) of remote control terminal 200, for example. If it is determined that the recording start time has been fixed (YES in step S510), the processes goes to step S512. If not (NO in step S510), the process returns to step S508. In step S512, system control circuit 110 writes the data of the recording start time to field 302 of memory 112.

In step S514, system control circuit 110 outputs the command to display the recording setting screen. When the command is output, the screen displayed on television set 150 is switched to the screen for setting the recording finish time. In step S516, system control circuit 110 detects an input of recording finish position. This detection is made in response to a prescribed button manipulation by the user on remote control terminal 200. The process is executed in the same manner as the process in step S508, and thus, description thereof is not repeated.

In step S517, system control circuit 110 calculates a recording finish time from the recording finish position. The calculation is performed based on, e.g., the current time, the current position on the meter, the detected recording finish position, and the capacity of the save area in hard disk device 140. The save area refers to the area where data can be written or erased based on a user instruction. The capacity of the save area is converted to a time period (hereinafter, "recordable time period"). The recordable time period is converted to the length (hereinafter, "save area length") to be displayed on the meter. A difference between the position indicating the current time and the recording finish position set by the user is calculated. A ratio of the difference with respect to the save area length is calculated. The time period subsequent to the current time is calculated based on the ratio and the recordable time period. The recording finish time is calculated by adding the relevant time period to the current time.

In step S518, system control circuit 110 determines whether the recording finish time has been decided. This determination is made based on, e.g., whether data recording and reproduction apparatus 100 has received a prescribed remote control signal from remote control terminal 200. If it is determined that the recording finish time has been decided (YES in step S518), the process goes to step S520. If not (NO in step S518), the process returns to step S516.

In step S520, system control circuit 110 calculates a recording time period based on the recording start time and the recording finish time. In step S522, system control circuit 110 determines whether the recording time period selected by the user has already been selected for another recording. This determination is made based on whether there exits a recording start time or finish time included in other programmed information between the recording start time and the recording finish time just selected. If it is determined that the selected recording time period has already been selected (YES in step S522), the process goes to step S524. If not (NO in step S522), the process goes to step S525.

In step S524, system control circuit 110 outputs to OSD image generating circuit 114 a signal to display a message of overlapped programming. As such, the message to the effect that the time period selected by the user has already been selected for another recording is displayed on television set 150. In step S525, system control circuit 110 calculates storage capacity required for recording (hereinafter, referred to as the "required capacity") from the recording time period calculated in step S520. It is calculated based on, e.g., the recording time period and the recording mode such as high-quality, standard or the like. In this case, the recording time period becomes shorter when recording in the high-quality mode is selected, compared to the case where the standard mode is selected.

In step S526, system control circuit 110 determines whether the required capacity exceeds the storage capacity (i.e., the size of free space) of the HDD. If it is determined that the required capacity exceeds the storage capacity of the HDD (YES in step S526), the process goes to step S528. If not (NO in step S526), the process goes to step S530. In step S528, system control circuit 110 outputs to OSD image generating circuit 114 a signal to display a message that the storage capacity of the HDD is insufficient. The message is displayed on television set 150.

In step S530, system control circuit 110 writes the data indicating the recording finish time to field 304 of memory 112. In step S532, system control circuit 110 determines whether an input to fix the meter recording setting has been detected. The input is detected, e.g., when light-receiving portion 124 receives a prescribed signal from remote control terminal 200. If it is determined that the input to fix the meter recording setting has been detected (YES in step S532), the process goes to step S600. If not (NO in step S532), the process goes to step S534. In step S534, system control circuit 110 waits for a prescribed period of time before returning to step S532. In step S600, system control circuit 110 executes the recording process as will be described later. When the process is executed, the recording of a program is started at the recording start time having been set, and finished at the recording finish time having also been set.

Figure 8:
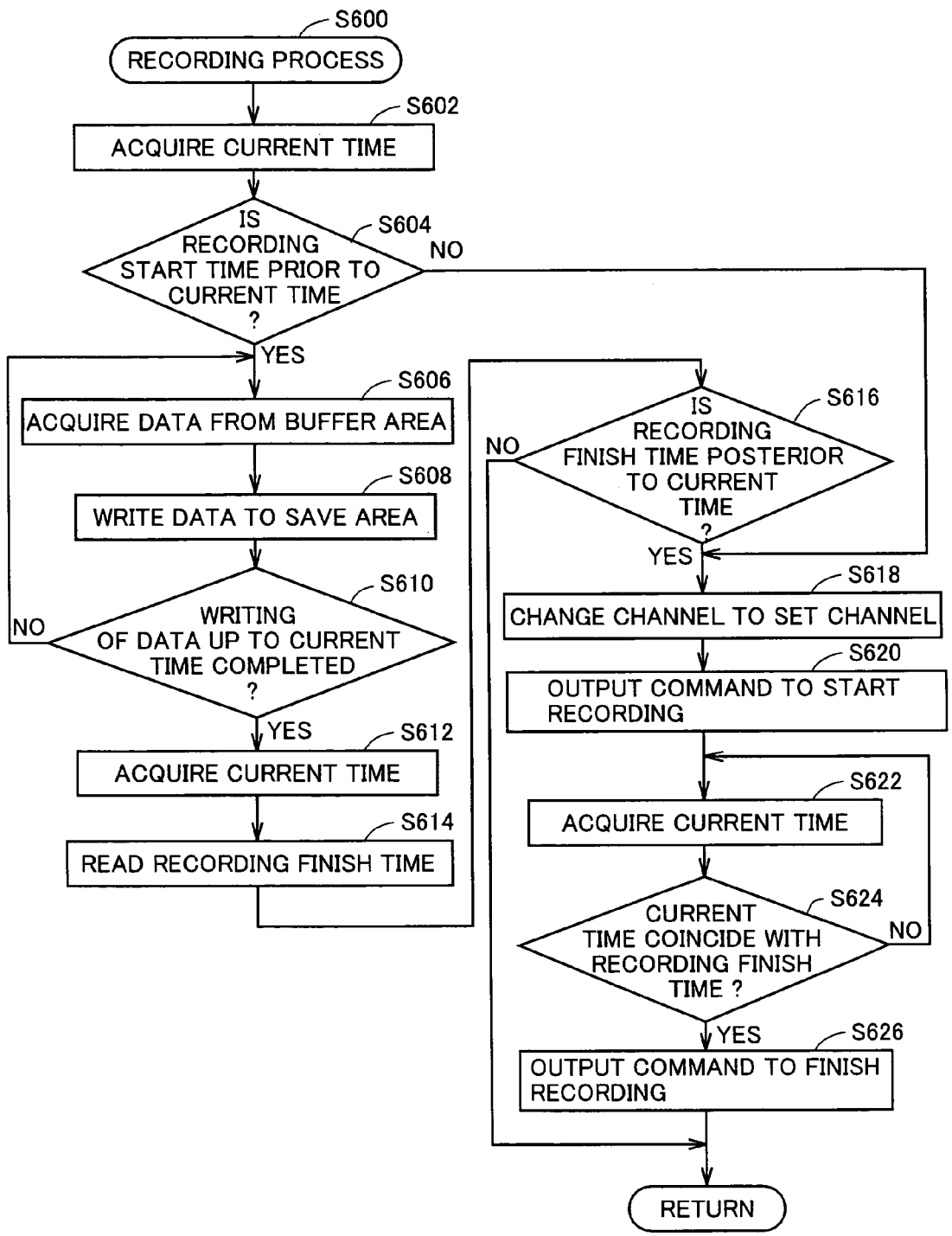
FIG. 8 is a flowchart illustrating procedure of the recording process performed by the system control circuit.

A control structure of the recording process by system control circuit 110 according to the present embodiment is now described with reference to FIG. 8.

In step S602, system control circuit 110 acquires the current time from clock circuit 126. In step S604, system control circuit 110 determines whether the recording start time is prior to the current time. This determination is made based on comparison of the acquired current time with the data stored in field 302 of memory 112. If it is determined that the recording start time is prior to the current time (YES in step S604), the process goes to step S606. If not (NO in step S604), the process goes to step S618.

In step S606, system control circuit 10 acquires data from buffer area 146 of hard disk 144. The data is one of a program of the channel set by the user and temporarily stored in the buffer area while data recording and reproduction apparatus 100 is on. In step S608, system control circuit 110 writes the data to save area 147 of hard disk 144. Save area 147 is the area in which data is erased only by a predetermined manipulation. In step S610, system control circuit 110 determines whether writing of the data up to the current time has been completed. This determination is made by comparing the then time with the stored time data every time a prescribed writing operation by information recording head 142 is finished. For example, when the finished time of the writing is subsequent to the time of the time data, it is determined that data writing is completed. If it is determined that the data writing has been completed (YES in step S610), the process goes to step S612. If not (NO in step S610), the process returns to step S606. In step S612, system control circuit 10 acquires the current time from clock circuit 126. In step S614, system control circuit 110 reads the recording finish time data stored in field 302 of memory 112.

In step S616, system control circuit 110 determines whether the recording finish time is posterior to the current time. This determination is made by comparing the times. If the recording finish time is posterior to the current time (YES in step S616), the process goes to step S618. If not (NO in step S616), the process is completed, and the control is returned to the main process (i.e., the recording time setting process). In step S618, system control circuit 110 changes the channel of tuner 130 to a set channel. This change is performed by outputting a prescribed control signal to tuner 130.

In step S620, system control circuit 110 outputs a command to start recording. When the command is output, MPEG encoder 132 encodes the signal received by tuner 130. The coded signal is recorded on a prescribed save area of hard disk 144 by means of information recording head 142. In step S622, system control circuit 110 acquires the current time from clock circuit 126. In step S624, system control circuit 110 determines whether the current time coincides with the recording finish time. If the current time coincides with the recording finish time (YES in step S624), the process goes to step S626. If not (NO in step S624), the process returns to step S622. In step S626, system control circuit 110 outputs a command to finish recording. When the command is output, writing of the data to hard disk 144 by means of information recording head 142 is finished.

Hereinafter, the case where the user records a program broadcast on television is explained in conjunction with the operations of data recording and reproduction apparatus 100 of the present embodiment based on the structures and flowcharts as described above.

When the user depresses a prescribed button of remote control terminal 200 to select the meter recording setting mode, a remote control signal is sent to data recording and reproduction apparatus 100. When light-receiving portion 124 of data recording and reproduction apparatus 100 receives the signal, selection of the meter recording setting mode is detected (step S502). When a prescribed command is output from data recording and reproduction apparatus 100 to television set 150 (step S506), the meter recording setting screen is displayed on television set 150 (FIG. 5A).

When the user, while watching the meter recording setting screen displayed on television set 150, manipulates cursor button 220 of remote control terminal 200 to designate the recording start position, the position is converted to the time and displayed on television set 150 (FIG. 5B). The meter display is changed in response to the manipulation of cursor button 220, and the position of the display is detected (step S508).

The time corresponding to the position is calculated based on the relevant position, the current time and the current meter display (step S509). When the user depresses a prescribed button on remote control terminal 200, the recording start position is decided (YES in step S510). The time is stored in field 302 of memory 112 as the recording start time data (step S512). Thereafter, the meter recording setting screen displayed on television set 150 is switched to the input screen of recording finish position (step S514).

When the user manipulates cursor button 220 of remote control terminal 200 in the same manner as the case of inputting the recording start position, the position is converted to the time and displayed on television set 150 (FIG. 5C). The meter display is changed in response to the manipulation of cursor button 220, and the position of the display is detected (step S516).

The time corresponding to the position is calculated as the recording finish time, based on the relevant position, the current time and the current meter display (step S517). When the user depresses a prescribed button on remote control terminal 200, the recording finish position is decided (YES in step S518). If the recording time period selected by the user has not yet been selected for another programmed recoding (NO in step S522), and if the required capacity does not exceed the storage capacity of hard disk device 140 (NO in step S526), then the recording finish time is stored in memory 112 (step S530).

When the user depresses a prescribed button on remote control terminal 200, the meter recording setting is confirmed (YES in step S532), and the recording is started (step S600). If the recording start time set by the user is prior to the current time (YES in step S604), data of the program already received and temporarily stored in the buffer area of hard disk device 140 is acquired (step S606), and the data is written into a prescribed save area of hard disk 144 (step S608). When writing of the data up to the current time is completed (YES in step S610), the then time is acquired (step S612), and the recording finish time is read from field 304 of memory 112 (step S614).

When the recording finish time is set posterior to the current time (YES in step S616), the channel of tuner 130 is changed to the channel set by the user (step S618). When the command to start recording is output from system control circuit 110 to hard disk device 140 (step S620), writing of the data to save area 147 of hard disk 144 is started.

Thereafter, when the current time becomes the recording finish time (YES in step S624), a command to finish recording is output from system control circuit 110 to hard disk device 140 (step S626), and the data writing to hard disk device 140 is finished.

As described above, data recording and reproduction apparatus 100 according to the present embodiment causes television set 150 to display the recording start position and the recording finish position by the meter display, for example, in response to the button manipulations by the user via remote control terminal 200. The positions are converted to the recording start time and the recording finish time based on the current time and the corresponding position on the meter. With this configuration, the user can set the times without directly inputting the same, ensuring accurate setting of the times for programmed recording. Accordingly, a data recording and reproduction apparatus capable of reducing manipulation mistakes by the user can be provided.

Hereinafter, an embodiment according to another aspect of the present invention is described. The data recording and reproduction apparatus according to the present aspect differs from the data recording and reproduction apparatus 100 of the above-described embodiment in that it can transfer the data temporarily stored in buffer area 146 to save area 147 as a whole after the recording finish time has passed. The hardware configuration of the data recording and reproduction apparatus according to the present aspect is identical to that of the data recording and reproduction apparatus shown in FIG. 1, and thus, description thereof is not repeated.

Figure 9:
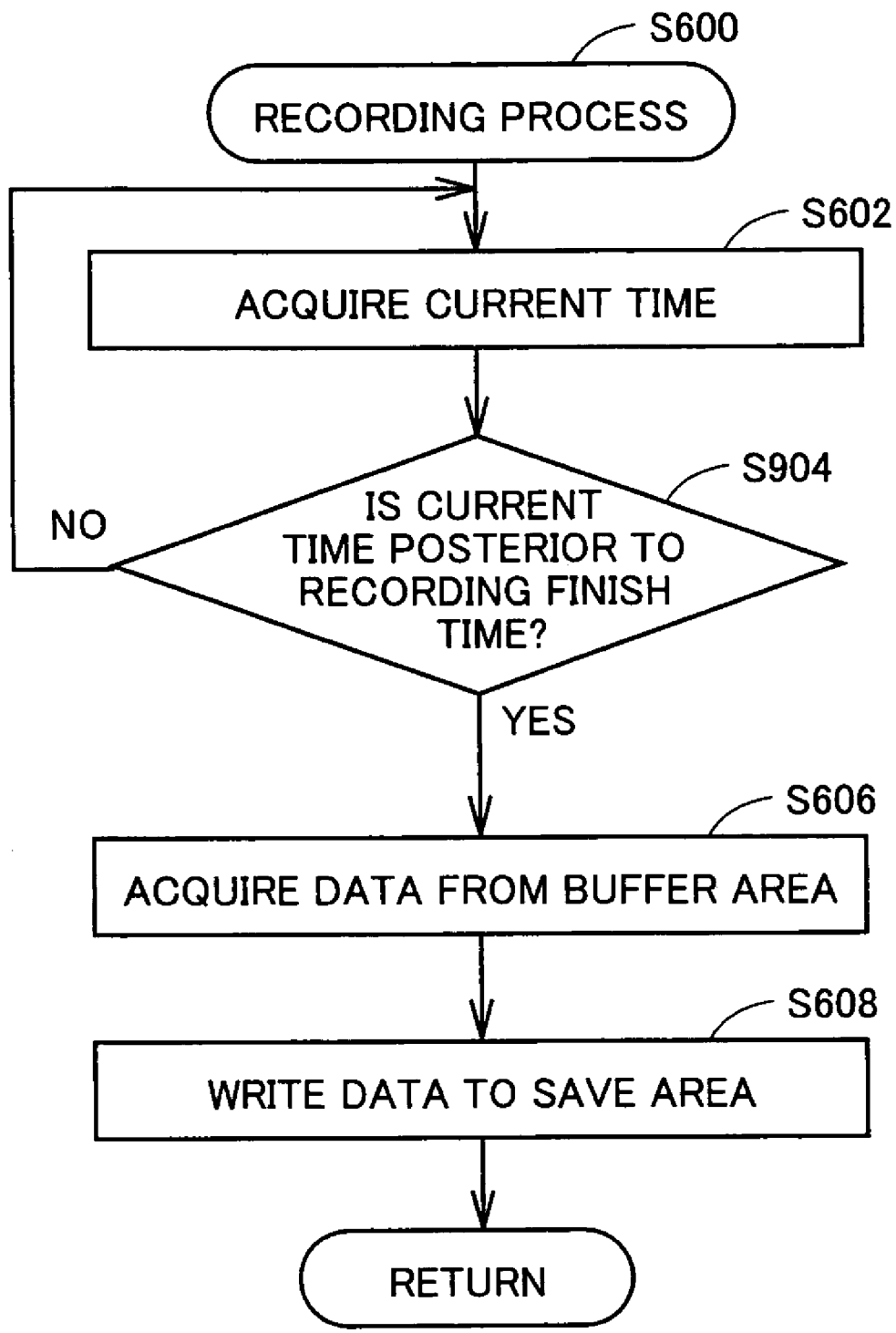
FIG. 9 is a flowchart illustrating procedure of the recording process performed by a system control circuit according to another aspect of the present invention.

A control structure of the recording process according to the system control circuit 110 of the present aspect is now described with reference to FIG. 9. The same step number as in FIG. 8 denotes the same process step, and description thereof is not repeated.

In step S904, system control circuit 110 determines whether the current time is posterior to the recording finish time. If it is determined that the current time is now posterior to the recording finish time (YES in step S904), the process goes to step S606. If not (NO in step S904), the process returns to step S602.

Operations of the data recording and reproduction apparatus according to the present aspect based on the structure and flowchart as described above is now described. Description of the operations the same as those of data recording and reproduction apparatus 100 of the above-described embodiment is not repeated.

When the user sets the recording finish time, the data is stored in a memory (step S530). When an input to confirm the meter recording setting is detected (YES in step S532), the recording process is started (step S600). The current time is acquired from clock circuit 126 (step S602). When the current time is posterior to the recording finish time (YES in step S904), the data stored in buffer area 146 of hard disk 144 is read (step S606). The data is written to save area 147 of hard disk 144 (step S608), which is saved until otherwise instructed by the user.

As such, the data recording and reproduction apparatus according to the present aspect transfers the data recorded on buffer area 146 as a whole to save area 147 after the recording finish time. By doing so, occurrence of errors at the time of reading or writing of data can be suppressed, and reliable transfer of the data to save area 147 is ensured.

In the data recording and reproduction apparatus according to the one or the other aspect of the present invention, the received audio-visual data has been recorded by transferring and writing the same from buffer area 146 to save area 147. Alternatively, the audio-visual data may be saved over a long term, by changing the attribute of the audio-visual data stored in management area 145. For example, when the attribute of each sector for recording data formed in buffer area 146 is changed from "temporarily recorded" to "saved over long term", the overwrite of the data to the sector having the attribute of "saved over long term" is prohibited. In doing so, the data temporarily recorded on buffer area 146 can be saved over a long term, without being transferred to another area.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data recording and reproduction apparatus, comprising:
    a receiving portion configured to receive audio-visual data;
    a recording portion configured to record said received audio-visual data;
    a reproduction portion configured to reproduce said recorded audio-visual data;
    a display control portion configured to generate a signal to display a screen for setting a start time and a finish time of recording of said audio-visual data; and
    a detecting portion configured to detect an input by a user; wherein:
        said display control portion generates a signal to display a graphic form having a shape extending at least to a one-dimensional coordinate direction,
        said detecting portion detecting the input by said user on said displayed graphic form to set the start time and the finish time of said recording,
        said start time of said recording is set by moving a bar displayed on the graphic form left or right in the one-dimensional coordinate direction, a final location of the bar on the graphic form corresponding to the start time of the recording, and
        said finish time of said recording is set by moving a bar displayed on the graphic form left or right in the one-dimensional coordinate direction, a final location of the bar on the graphic form corresponding to the finish time of the recording.

2. The data recording and reproduction apparatus according to claim 1, wherein
    said graphic form having the shape extending at least to the one-dimensional coordinate direction is of a rectangular shape, and
    said one-dimensional coordinate direction of said rectangular shape corresponds to data storage capacity of said recording portion.

3. The data recording and reproduction apparatus according to claim 1, further comprising:
    a management portion configured to manage a storage area of said recording portion by dividing the storage area into a buffer area for recording said audio-visual data temporarily and a save area for recording said audio-visual data over a long term; and
    a recording and reproduction control portion configured to control said recording portion and said reproduction portion to record said audio-visual data on said buffer area and at the same time sequentially reproduce the data received in the past and recorded on said buffer area;
    said detecting portion configured to detect an input by said user on said displayed graphic form to save the data temporarily recorded on said buffer area over a long term.

4. The data recording and reproduction apparatus according to claim 3, wherein
    said graphic form having a shape extending at least to a one-dimensional coordinate direction is of a rectangular shape, and
    said one-dimensional coordinate direction of said rectangular shape corresponds to data storage capacity of said recording portion.

5. The data recording and reproduction apparatus according to claim 3, wherein said management portion manages said recording portion based on the detected input by said user to record said audio-visual data recorded on said buffer area on said save area.

6. The data recording and reproduction apparatus according to claim 5, wherein
    said graphic form having a shape extending at least to a one-dimensional coordinate direction is of a rectangular shape, and
    said one-dimensional coordinate direction of said rectangular shape corresponds to data storage capacity of said recording portion.

7. The data recording and reproduction apparatus according to claim 3, wherein
    said recording portion records attribute data representing an attribute of said audio-visual data, and
    said management portion, based on the detected input by said user, changes a content of said attribute data for said audio-visual data recorded on said buffer area to a content indicating that said data is to be saved over a long term.

8. The data recording and reproduction apparatus according to claim 7, wherein
    said graphic form having a shape extending at least to a one-dimensional coordinate direction is of a rectangular shape, and
    said one-dimensional coordinate direction of said rectangular shape corresponds to data storage capacity of said recording portion.

* * * * *